(12) United States Patent
Tasker et al.

(10) Patent No.: US 7,006,493 B1
(45) Date of Patent: Feb. 28, 2006

(54) VIRTUAL VOICE PORT CONFIGURED TO CONNECT A SWITCHED VOICE CALL TO A PERMANENT VOICE CALL

(75) Inventors: Michael Tasker, Pleasanton, CA (US); Patrik Buckingham, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/265,508

(22) Filed: Mar. 9, 1999

(51) Int. Cl.
*H04L 12/66* (2006.01)

(52) U.S. Cl. .................. 370/356; 370/389; 370/463

(58) Field of Classification Search ............... 370/389, 370/400–401, 352–356, 466–467, 470–471, 370/474–477, 493–495, 395.51–395.52, 370/395.6, 395.61, 395.63
See application file for complete search history.

(56) References Cited

U.S. PATENT DOCUMENTS

| | | |
|---|---|---|
| 4,747,130 A | 5/1988 | Ho |
| 4,862,452 A | 8/1989 | Milton et al. |
| 4,955,054 A | 9/1990 | Boyd, Jr. et al. |
| 4,991,169 A | 2/1991 | Davis et al. |
| 5,150,357 A | 9/1992 | Hopner |
| 5,224,099 A | 6/1993 | Corbalis et al. |
| 5,313,454 A | 5/1994 | Bustini et al. |
| 5,359,592 A | 10/1994 | Corbalis et al. |
| 5,367,678 A | 11/1994 | Lee et al. |
| 5,410,599 A | 4/1995 | Crowley et al. |
| 5,434,981 A | 7/1995 | Lenihan et al. |
| 5,440,740 A | 8/1995 | Chen et al. |
| 5,442,789 A | 8/1995 | Baker et al. |
| 5,452,306 A | 9/1995 | Turudic et al. |
| 5,457,687 A | 10/1995 | Newman |
| 5,497,373 A | 3/1996 | Hulen et al. |
| 5,515,363 A | 5/1996 | Ben-Nun et al. |
| 5,526,344 A | 6/1996 | Diaz et al. |
| 5,528,595 A | 6/1996 | Walsh et al. |
| 5,546,395 A | 8/1996 | Sharma et al. |
| 5,561,663 A | 10/1996 | Klausmeier |
| 5,594,727 A | 1/1997 | Kolbenson et al. |
| 5,602,848 A | 2/1997 | Andrews et al. |
| 5,615,211 A | 3/1997 | Santore et al. |
| 5,617,423 A | 4/1997 | Li et al. |
| 5,623,491 A | 4/1997 | Skoog |
| 5,625,845 A | 4/1997 | Allran et al. |

(Continued)

FOREIGN PATENT DOCUMENTS

GB          2200816 A       8/1988

(Continued)

OTHER PUBLICATIONS

Doug O'Leary, "Frame Relay/ATM PVC Service Interworking Implementation Agreement," Frame Relay Forum, pp. 1-24, Apr. 14, 1995.

(Continued)

*Primary Examiner*—Chi Pham
*Assistant Examiner*—Thai Hoang
(74) *Attorney, Agent, or Firm*—Blakely, Sokoloff, Taylor & Zafman LLP (57) ABSTRACT

A method for routing integrated traffic from a remote site to a voice over packet system is disclosed. The method comprises receiving control signals at a virtual voice port of the voice over packet system. The method also comprises translating the controls signals to internal signals of the voice over packet system. Additionally, the method comprises transmitting data from the remote site to the virtual voice port and transferring the transmitted data form the virtual voice port to the physical port.

32 Claims, 7 Drawing Sheets

U.S. PATENT DOCUMENTS

| | | | |
|---|---|---|---|
| 5,719,865 | A | 2/1998 | Sato |
| 5,724,513 | A | 3/1998 | Ben-Nun et al. |
| 5,734,656 | A | 3/1998 | Prince et al. |
| 5,742,596 | A | 4/1998 | Baratz et al. |
| 5,745,490 | A | 4/1998 | Ghufran et al. |
| 5,748,468 | A | 5/1998 | Notenboom et al. |
| 5,765,032 | A | 6/1998 | Valizadeh |
| 5,771,232 | A | 6/1998 | Sinibaldi et al. |
| 5,777,984 | A | 7/1998 | Gun et al. |
| 5,793,747 | A | 8/1998 | Kline |
| 5,835,494 | A | 11/1998 | Hughes et al. |
| 5,838,994 | A | 11/1998 | Valizadeh |
| 5,862,211 | A | 1/1999 | Roush |
| 5,883,804 | A | 3/1999 | Christensen |
| 5,894,477 | A | 4/1999 | Brueckheimer et al. |
| 5,909,443 | A | 6/1999 | Fichou et al. |
| 5,974,033 | A | 10/1999 | Kamiya et al. |
| 6,002,666 | A | 12/1999 | Fukano |
| 6,005,868 | A | 12/1999 | Ito |
| 6,009,507 | A | 12/1999 | Brooks et al. |
| 6,011,780 | A | 1/2000 | Vaman et al. |
| 6,028,858 | A | 2/2000 | Rivers et al. |
| 6,052,375 | A | 4/2000 | Bass et al. |
| 6,058,117 | A | 5/2000 | Ennamorato et al. |
| 6,069,872 | A | 5/2000 | Bonomi et al. |
| 6,104,721 | A | 8/2000 | Hsu |
| 6,118,864 | A | 9/2000 | Chang et al. |
| 6,128,301 | A * | 10/2000 | Bernstein .................... 370/396 |
| 6,144,637 | A | 11/2000 | Calvignac et al. |
| 6,157,648 | A * | 12/2000 | Voit et al. ................... 370/401 |
| 6,181,694 | B1 | 1/2001 | Pickett |
| 6,266,342 | B1 | 7/2001 | Stacey et al. |
| 6,272,109 | B1 | 8/2001 | Pei et al. |
| 6,307,866 | B1 | 10/2001 | Hayter |
| 6,311,288 | B1 | 10/2001 | Heeren et al. |
| 6,337,858 | B1 * | 1/2002 | Petty et al. ................. 370/356 |
| 6,426,955 | B1 * | 7/2002 | Gossett Dalton, Jr. et al. ......................... 370/401 |
| 6,449,269 | B1 * | 9/2002 | Edholm ...................... 370/352 |
| 6,483,835 | B1 * | 11/2002 | Tanigawa et al. ...... 370/395.21 |

FOREIGN PATENT DOCUMENTS

WO          94/16528         7/1994

OTHER PUBLICATIONS

Gary Lee, et al., "A Management Briefing on Frames to Cells, Frame Relay and Frame UNI in ATM Networks," General DataComm, pp. 1-12 (1997).

Addison Ching, "CEDPA Launches Discussion Lists," Oct.-Nov. 1997, The DataBus, vol. 37, No. 6, pp. 1-10 (Huntington Beach, CA, Oct.-Nov. 1997).

B. Thompson, et al., "DSP Resource Manager Interface and its Role in DSP Multimedia," IEEE, pp. 291-298, 1994.

Edward B. Morgan, "Voice Over Packet, White Paper," Telogy Networks, pp. 1-13, 1997.

S. Mangiapane, "Cisco Announces MC3810 Multiservice Access Concentrator," The Databus, vol. 37, No. 6, pp. 1-3, Oct.-Nov. 1997.

Voice Over Frame Relay Implementation Agreement, FRF 11.1, Frame Relay Forum Technical Committee, pp. I-vi and 1-46 (Revision History: FRF. 11 May 1997; FRF .11.1 Annex J Added Dec. 1998).

Annex B to Voice Over Frame Relay Implementation Agreement, FRF .11, Frame Relay Forum Technical Committee, pp. B-1 & B-2 (May 1997).

R. Iyer & Cisco Systems, A TDM Interface for the TMS320C54X DSP, Application Report: SPRA453, Digital Signal Processing Solutions (Texas Instruments Jun. 1998).

"ATM Trunking using AAL2 for Narrowband Services" The ATM Forum Technical Committee, AF-VTOA-0113.000, Feb. 1999, 58 pages.

International Search Report mailed Jun. 23, 2000 for counterpart International Application No. PCT/US99/29690, International Filing Date Dec. 13, 1999.

"Task Management of Multiple Digital Signal Processors," IBM Technical Disclosure Bulletin, vol. 34, No. 7B, pp. 237-239, Dec. 1991).

* cited by examiner

VIRTUAL VOICE PORT CONFIGURED TO CONNECT A SWITCHED VOICE CALL TO A PERMANENT VOICE CALL

FIELD OF THE INVENTION

The present invention relates to increasing the number of ports in a voice over packet system. More particularly, the present invention relates to using a virtual voice port to increase the number of available ports in a voice over packet system that supports both permanent virtual connections and switched virtual connections.

BACKGROUND

Developments in router technology have led to system designs that provide a general-purpose connection-oriented transfer mode for a wide range of services. These services include the simultaneous transfer of integrated traffic (data, voice, and video traffic) over the same network system. Prior art systems have typically relied on two connections types, a switched virtual connection and a permanent virtual connection, to support the transfer of different services over the same network.

The switched virtual connection ("SVC") relies on control protocols initiated by a physical interface to establish connections across a network. Specifically, an originating device uses control protocols to request a network connection between the originating device and the destination device. Typically, in an SVC, intermediate nodes of the network use the physical (and logical) address of the originating device to create a virtual path between the originating device and the destination device. Once the call is terminated, however, the virtual path is removed. The removal of the virtual path allows for the creation of additional virtual paths, thus increasing transmission bandwidth across the network.

In contrast, a permanent virtual connection ("PVC") uses initial network management to establish a permanent link between two nodes. The PVC provides a stable transmission path that ensures dedicated connectivity between two nodes. The PVC, however, reduces transmissions bandwidth because, unlike the SVC, the PVC assumes control of a subset of transmission links for an indefinite period of time. Additionally, the PVC reduces the availability of transmission ports in both the originating device and the destination device.

Examples of a PVC include analog private phone lines, digital private phone lines, a direct connection between two private branch exchanges ("PBXs",) or Frame Relay Forum ("FRF") protocols that deal exclusively with permanent calls—such as the FRF.11 protocol. Examples of a SVC include a telephone to telephone call predicated by a dialing sequence to request a connection and asynchronous transfer mode ("ATM") networks that use a cell-based switching and multiplexing technology to provide services for both local area networks and wide area networks. Regardless of the connection service used (SVC or PVC), prior art network systems typically use a physical port and a routing system to connect to a transmission network.

Figure 1:
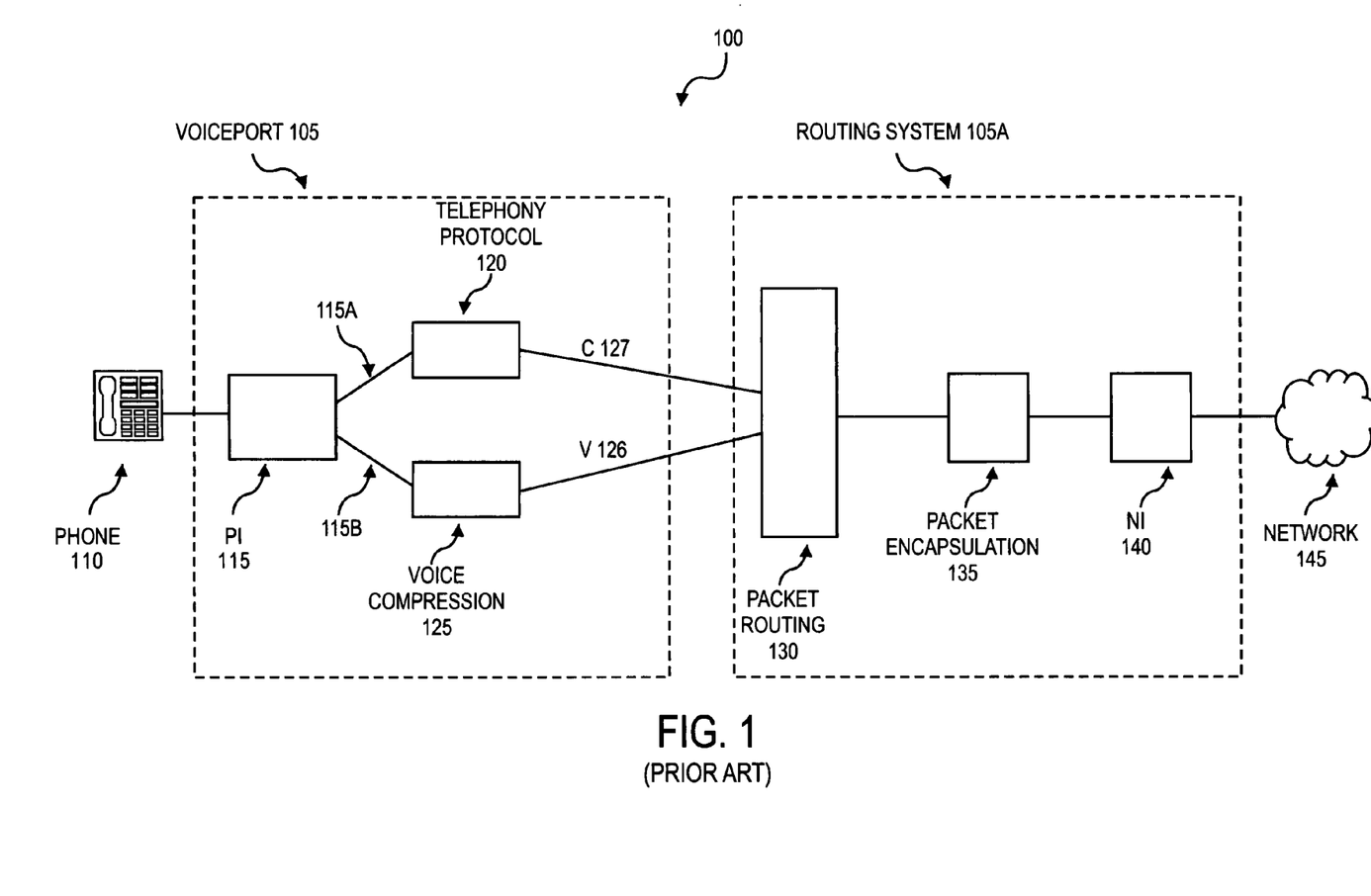
FIG. 1 shows a prior art voice port coupled to a network.

FIG. 1 shows a prior art voice port coupled to a network. In particular, system 100 includes a voice port (105), also referred to as a physical port, coupled to a routing system (105a). As illustrated in FIG. 1, voice port 105 is coupled to phone 110 via physical interface ("PI") 115. PI 115 is responsible for multiplexing the control and audio signals of phone 110 to lines 115a and 115b, respectively.

The control signals are routed to telephony protocol 120. Using the phone 110 control signals, telephony protocol 120 negotiates with other voice ports through a call management control (not shown) to gain access to routing system 105a. Provided voice port 105 has access to routing system 105a, telephony protocol 120 transmits the control signals to routing system 105a via C127. Routing system 105, in turn, uses the control signals to establish a connection with a remote physical device. For example, if phone 110 is used to generate a SVC to a remote phone. The on-hook and off-hook signals of phone 110 denote control signals used to initiate a SVC connection. Additionally, the numbers dialed by phone 110 are control signals used to select a termination point of the SVC. Furthermore, the ringing tone, or alternatively the busy tone, transferred back to telephony protocol 120 via network 145 denotes the remote phone's response to the connection attempts by phone 110.

Following the previous example, once the control signals have established a connection with the remote device, the audio signals of phone 110 are routed to voice compression block 125. Voice compression block includes a digital signal processor ("DSP") device that converts the audio signals into a digitized voice payload. The digital voice payload, in turn, is transferred to routing system 105a via line V126.

Routing system 105a is used to format both the control signals and the digitized data generated by voice port 105. The formatted data is subsequently transferred to a remote device via network 145. Network 145 comprises an ATM or Frame Relay network. Accordingly, routing system 105a generates packet data for transmission along network 145. In particular, packet routing 130 selects a digitized payload from either voice port 105 or other voice ports (not shown) coupled to routing system 105a. The selected digitized payload is transferred to packet encapsulation 135. In packet encapsulation 135, based on the protocol of network 145, packets are generated from the digitized payload. Additionally, in packet encapsulation 135 packet addressing information and packet headers are append to the generated packets. Subsequently, the packets are transferred to network interface ("NI") 140 for transmission over network 145. Typically, NI 140 includes a serial interface or ethernet connection to network 145.

System 100 provides a basic system for connecting devices in a network that uses either a SVC or a PVC. System 100, however, results in numerous disadvantages when used in a heterogeneous networking system that uses both PVC and SVC. One disadvantage results from the network requirements associated with a PVC. Specifically, in a PVC at least two physical ports are designated as PVC connections. Thus, the number of available resources for SVCs is reduced. For example, if voice port 105 is designated as the terminating point of a given PVC, voice port 105 is excluded from receiving SVCs from other remote devices. Isolating voice port 105 necessitates the addition of a second voice port to support SVCs. Another disadvantage results from the typical design of voice over packet ("VOP") systems. VOP systems are designed to connect a limited number of voice ports to a single routing system. In a PVC/SVC networking system, however, a subset of the VOP voice ports are dedicated to PVCs. The dedicated PVCs result in a VOP with a reduced number of voice ports for SVCs.

SUMMARY OF THE INVENTION

It is therefore an object of the invention to provide a voice over packet ("VOP") system that communicates with a multitude of remote sites, both through permanent calls and switch calls, without reducing the number of available physical ports.

It is a further object of the invention to provide a virtual port that emulates a physical port, thus providing a port that can initiate or terminate PVCs.

These and other objects of the invention are provided by a method for routing integrated traffic from a remote site to a voice over packet system. The method comprises receiving control signals at a virtual voice port of the voice over packet system. The control signals request a data transmission from the remote site to the voice over packet system. The method also comprises translating the controls signals to internal signals of the voice over packet system. The translated signals are operable to couple the virtual voice port to a physical port of the voice over packet system. Additionally, the method comprises transmitting data from the remote site to the virtual voice port and transferring the transmitted data form the virtual voice port to the physical port.

Other features and advantages of the present invention will be apparent from the accompanying drawings and from the detailed description that follows.

BRIEF DESCRIPTION OF THE DRAWINGS

The features and advantages of the present invention are illustrated by way of example and not limitation in the figures of the accompanying drawings in which like references indicate similar elements and in which.

DETAILED DESCRIPTION

A method for incorporating a virtual voice port into a voice over packet ("VOP") system is disclosed. The virtual voice port emulates a terminating node (i.e. a physical voice port) for a permanent virtual connection ("PVC") linked to the VOP system. Thus, the VOP system supports a PVC without reducing the number of physical voice ports included in the VOP system. For one embodiment, the physical voice ports are used to initiate switched virtual connections ("SVCs"). For an alternative embodiment, the virtual voice port is operable to accept switched calls from physical voice ports of the VOP system. Thus, the virtual voice port allows dialed access from the physical ports to the PVC link.

For another embodiment, a pair of virtual voice ports are used to provide a conversion mechanism between two different PVC protocols. Specifically, a VOP system with a first virtual voice port is used to receive data on a first PVC. Subsequently, the VOP system converts the incoming data to a different PVC protocol and transfers the output of the first virtual port to a second virtual voice port. For one embodiment, the second voice port is coupled to a second PVC. Thus, the VOP system provides a conversion mechanism between two different PVC protocols.

An intended advantage of an embodiment of the invention is to provide a VOP system that communicates with a multitude of remote sites, both through permanent calls and switched calls, without reducing the number of available physical ports.

Another intended advantage of an embodiment of the invention is to provide a virtual port that emulates a physical port, thus providing a port that can initiate or terminate PVCs. Yet another intended advantage of an embodiment of the invention is to provide a VOP system that can translate between different PVC protocols.

Figure 2:
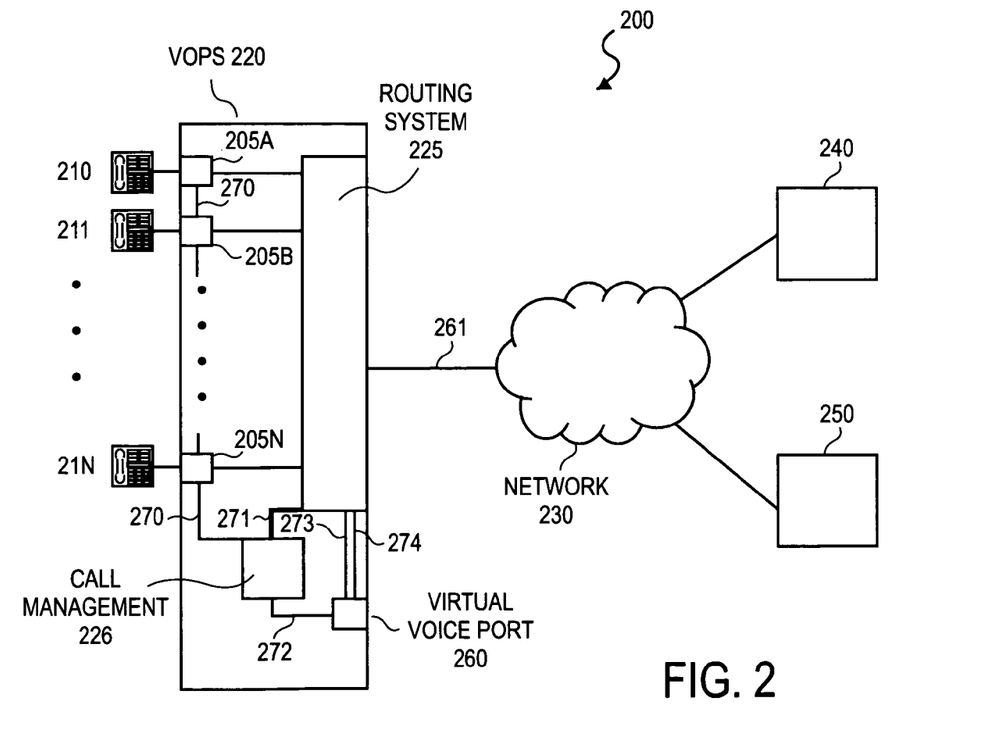
FIG. 2 illustrates one embodiment of a voice over packet system using a virtual voice port.

FIG. 2 illustrates one embodiment of a voice over packet system using a virtual voice port. In particular, system 200 includes a voice over packet system ("VOPS") 220 coupled to network 230 via line 261. Network 230, in turn, is coupled to node 240 and node 250. For one embodiment VOPS 220 supports both SVCs and PVCs. For alternative embodiments, network 230 comprises a cell-based multi-service network comprising Frame Relay, Asynchronous Transfer Mode ("ATM"), High-level Data Link Control ("HDLC"), Internet Protocol ("IP"), or Time Division Multiplexed ("TDM") networks. For another embodiment, VOPS 220 comprises an intermediate node in network 230. For yet another embodiment, line 261 comprises an input/output serial line or an input/output ethernet line used to transfer data.

As illustrated in FIG. 2, VOPS 220 includes phones 210–21N coupled to physical ports 205a–205n. For alternative embodiments, the physical ports 205a–205n are coupled to a video device, a facsimile device, or a modem. The physical ports 205a–205n are, in turn, coupled to call management 226 via line 270. The physical ports 205a–205n are also coupled to routing system 225.

VOPS 220 also includes a virtual voice port 260 coupled to call management 226 and routing system 225 via lines 272 and 273, respectively. For one embodiment, virtual voice port 260 accepts control signals generated by physical ports 205a–205n. Virtual voice port 260 converts the control signals into control signals used in a permanent call protocol. Thus, virtual voice port 260 provides VOPS 220 with a port for maintaining a PVC. For an alternative embodiment, virtual voice port 260 accepts voice packets generated by VOPS 220. Virtual voice port 260 converts the voice packets into packets following a permanent call protocol. For another embodiment, virtual port 260 converts the control signals and voice packets to a FRF.11 protocol. For yet another embodiment, virtual port 260 converts the control signals and voice packets to real time protocols ("RTP") including, but not limited to, a voice over Internet protocol ("VoIP") using a H.323 protocol.

As previously described, call management 226 is coupled to physical ports 205a–205n, virtual port 260, and routing system 225. Call management 226 provides configuration management for VOPS 220. In particular, call management 226 generates the setup messages used in SVCs. Call management 226 also determines the access of physical port 205a–205n to routing system 225.

For another embodiment, a pair of virtual voice ports is used to provide a conversion mechanism between two different PVC protocols. Specifically, a VOP system with a first virtual voice port is used to receive data on a first PVC. Subsequently, the VOP system converts the incoming data to a different PVC protocol and transfers the output of the first virtual port to a second virtual voice port. For one embodiment, the second voice port is coupled to a second PVC.

Thus, the VOP system provides a conversion mechanism between two different PVC protocols.

For one embodiment, virtual voice port 260 provides VOPS 220 with multiple functions. These functions comprise maintaining a permanent call connection between VOPS 220 and a remote node, connecting a permanent call to a switched call, and—in the case of a second virtual voice port included in VOPS 220—providing a data conversion mechanism between two different permanent call protocols. Virtual voice port 260 allows VOPS 220 to perform these functions without reducing the number of physical ports 205a–205n available for switched or permanent call connections. The functions are described below.

Maintaining a Permanent Call Connection

For one embodiment, a permanent call connection between VOPS 220 and a remote node is maintained through virtual voice port 260. In particular, virtual voice port 260 is assigned a number and a permanent point-to-point call is configured between virtual voice port 260 and the remote node. For example, for one embodiment, a FRF.11 protocol is setup between virtual voice port 260 and node 240. The FRF.11 protocol allows both node 240 and virtual voice port 260 to continuously transmit signaling state packets across network 230. These packets include, but are not limited to, on-hook and off-hook signals. For one embodiment, the on-hook and off-hook signals are used to initiate a transmission across the permanent call connection. The permanent call connection also provides a compressed audio or data path between virtual voice port 260 and node 240. For alternative embodiments, a VoIP H.323 protocol is setup between virtual voice port 260 and node 240.

Following the previous example, the permanent call connection between virtual voice port 260 and node 240 provides a remote presence on VOPS 220. Specifically, the continuous communication between virtual voice port 260 and node 240 emulates a system in which node 240 is existent on VOPS 220. For one embodiment, node 240 comprises a PBX, a physical port, or a live operator. For an alternative embodiment, node 240 comprises a virtual voice port. Thus, virtual voice port 260 provides a permanent call connection between VOPS 220 and a secondary virtual voice port.

Figure 3:
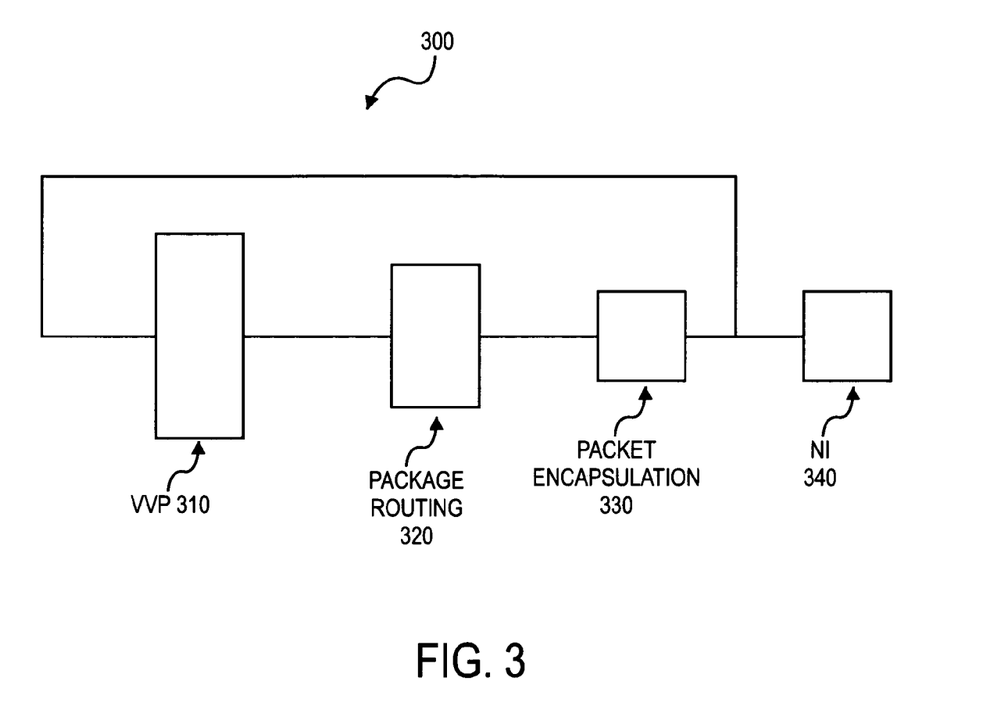
FIG. 3 illustrates one embodiment of a virtual voice port coupled to a routing system.

To maintain a permanent call connection, virtual voice port 260 is coupled to routing system 225. FIG. 3 illustrates one embodiment of a virtual voice port coupled to a routing system. In particular, system 300 comprises a virtual voice port ("VVP") 310 coupled to network interface ("NI") 340 via packet routing 320 and packet encapsulation 330. For one embodiment, system 300 is used in system 200. Accordingly, packet routing 320 selects a digitized payload from either VVP 310 or physical ports 205a–205n. The selected digitized payload is transferred to packet encapsulation 330. In packet encapsulation 330, packets are generated from the digitized payload. Additionally, in packet encapsulation 330 packet addressing information and packet headers are appended to the generated packets. Subsequent to packet generation, the packets are transferred to network interface ("NI") 340 for transmission over a network. For one embodiment, the network comprises an ATM network. Thus, packet encapsulation 330 generates packets based on the protocol of the ATM network. For another embodiment, the network comprises a Frame Relay network. Accordingly, packet encapsulation 330 generates packets based on the protocol of the Frame Relay network.

As illustrated in FIG. 3, VVP 310 is also directly coupled to NI 340. The direct coupling allows VVP 310 to maintain a permanent call via NI 340. For example, for one embodiment, NI 340 is coupled to a PVC that uses a FRF.11 protocol and an ATM network. Thus, both packet routing 320 and packet encapsulation 330 are used to format switch call data for transmission from physical ports (not shown) to the ATM network. The direct coupling between VVP 310 and NI 340, however, allows VVP 310 to emulate a destination end-point. Specifically, the direct coupling between VVP 310 and NI 340 allows VVP 310 to transmit and receive FRF.11 formatted data along the PVC while bypassing packet routing 320 and packet encapsulation 330. For alternative embodiments, the direct coupling between VVP 310 and NI 340 allows VVP 310 to transmit and receive permanent call formatted data.

Figure 4:
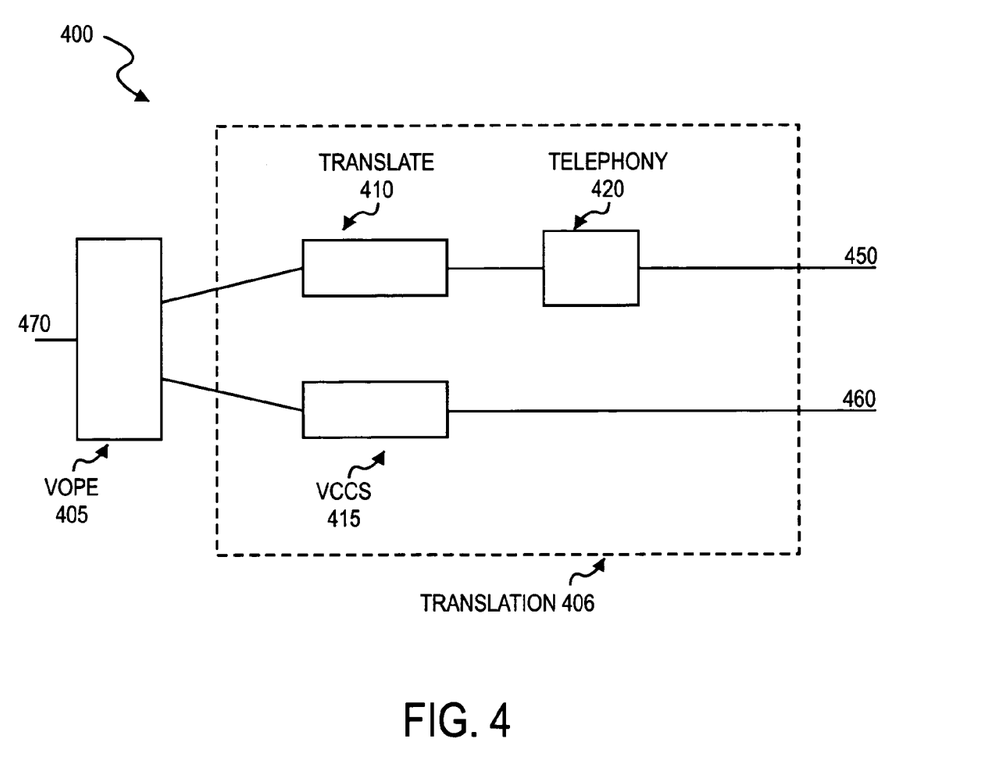
FIG. 4 illustrates one embodiment of a virtual voice port.

FIG. 4 illustrates one embodiment of a virtual voice port used to emulate a destination end-point. In particular, virtual voice port ("VVP") 400 comprises a voice over packet encapsulation ("VOPE") 405 coupled to translation block 406. For one embodiment, VOPE 405 transmits and receives packets following a permanent call protocol. Specifically, VOPE 405, adds packet addressing information and packet headers to the packets generated by translation block 406. For another embodiment, translation block 406 emulates a physical interface capable of accepting a switched call. Specifically, translation block 406 accepts the switched call control signals and voice packets over lines 450 and 460, respectively. Instead of effectuating the control signals or transmitting the voice packets, however, translation block 406 converts the switched call data to a permanent call protocol and transfers the data to VOPE 405. Alternatively, translation block 406 receives permanent call data from VOPE 405 and generates switched call format control signals and voice packets via lines 450 and 460, respectively.

For one embodiment, VVP 400 is used as the virtual voice port of VOPS 220. Accordingly, signal line 470 correlates to line 273. Signal line 450 correlates to line 272 and signal line 460 correlates to line 274. Furthermore, as illustrated in FIG. 3, the virtual voice port is directly coupled to the network interface of routing system 225. Thus, VOPE 405 is directly coupled to network 230 via line 273 and the network interface of routing system 225.

The direct coupling to network 230 allows VOPE 405 to maintain a permanent call connection. Translation block 406, however, provides VOPS 220 with a switched call interface to VVP 400. Thus, VVP 400 allows VOPS 220 to maintain a permanent call connection on network 230 while allowing physical ports 205a–205n to maintain a switched call connection.

Connecting a Permanent Call to a Switched Call

Virtual voice port 260 allows VOPS 220 to connect a permanent call to a switched call. The connection between a permanent call and a switched call occurs in two forms, an incoming permanent call received by virtual voice port 260 and outgoing switched call generated by any one of phones 210–21N. For one embodiment, to receive an incoming permanent call, virtual voice port 260 transfers the incoming permanent call to a preconfigured physical port. For another embodiment, the permanent call follows a FRF.11 Annex A dual tone multi-frequency ("DTMF") digit-relay syntax. Accordingly, virtual voice port 260 examines the incoming permanent call data and determines a physical port based on the digits specified in the DTMF digit relay packets. For yet another embodiment, virtual voice port 260 is coupled to a DSP (not shown). Thus, virtual voice port 260 is operable to detect DTMF digits included in compressed voice packets. Accordingly, virtual voice port 260 determines a physical port based on the digits included in the compressed voice packet.

Figure 5:
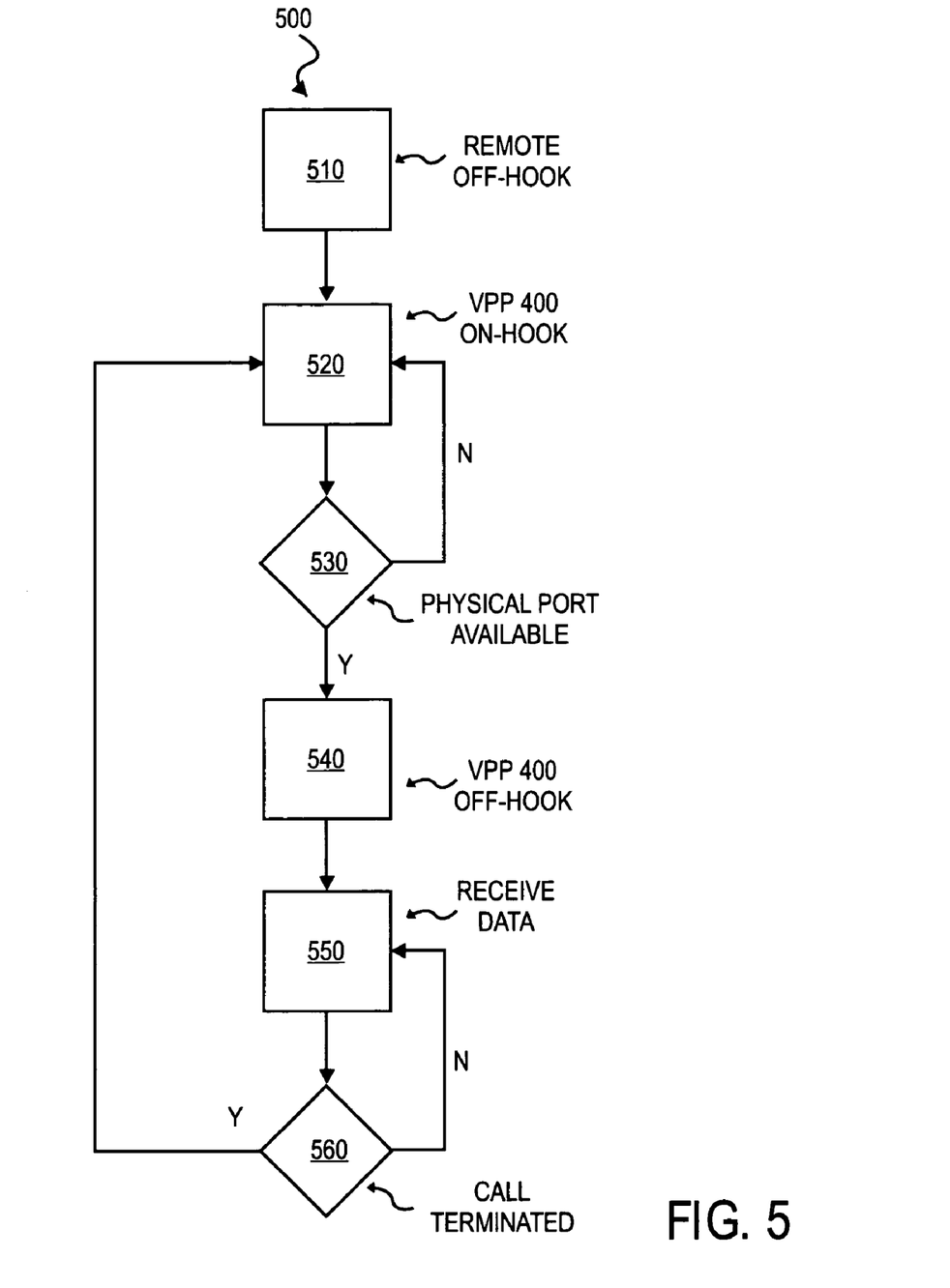
FIG. 5, shows one embodiment of a flow chart illustrating a permanent call connected to a switched call.

FIG. 5 shows one embodiment of a flow chart illustrating a permanent call connected to a switched call. In particular, flow chart 500 includes blocks 510 through 560. For one embodiment, the blocks show the steps used by VVP 400 to connect a permanent call, initiated by node 240, to a physical port of VOPS 220. As illustrated in FIG. 5, operation begins in block 510. At block 510, node 240 initiates a permanent call by transmitting control packets to VOPE 405. For one embodiment, node 240 transmits off-hook packets to initiate the permanent call. For another embodiment, node 240 transmits packets according to a FRF.11 protocol. For an alternative embodiment, node 240 transmits packets according to a VoIP protocol.

The control packets transmitted by node 240 are received in block 520. At block 520, however, the control packets have not been processed by VVP 400. Thus, at block 520 VVP 400 transmits on-hook packets to node 240. For one embodiment, translate 410 generates the off-hook packet. Subsequently, VOPE 405 transmits the off-hook packets every 20 milli-seconds ("ms"). For an alternative embodiment, VOPE 405 transmits packets according to a FRF.11 protocol. For another embodiment, VOPE 405 transmits packets according to a VoIP protocol.

At decision block 530, VVP 400 processes the control packets transmitted by node 240. Specifically, VVP 400 uses translate 410 and voice compression conversion sub-system ("VCCS") 415 to determine a destination point for the permanent call initiated by node 240. For example, for one embodiment, physical port 205a is a preconfigured destination point for the incoming permanent call. Thus, subsequent to receiving the control packets, VVP 400 initiates a call setup message requesting that call management 226 route the call from VVP 400 to physical port 205a. In particular, translate 410 generates an off-hook signal. The off-hook signal is routed to call management 226 via telephony protocol 420. Call management 226 responds to the off-hook signal with a dial tone indicating that routing system 225 is available to route the call. In response to the dial tone, translate 410 generates a sequence of digits mapped to physical port 205a. Physical port 205a, in turn, transmits a response to telephony protocol 420 that includes a ringing, busy, or connect signal. Provided a connect signal is received from physical port 205a, block 540 is processed. If a busy or ringing signal is received from physical port 205a, however, block 520 is re-processed.

For another embodiment, the control packets include specific packets that follow a DTMF digit-relay syntax. Accordingly, VCCS 415 examines the incoming permanent call data and identifies the DTMF digit-relay control packets. Using the DTMF digits in the DTMF digit-relay control packets, VVP 400 initiates a call setup message request with call management 226. Specifically, VVP 400 uses the DTMF digits during the call setup to identify a physical port. Subsequently, call management 226 routes the call from VVP 400 to the identified physical port. Provided a connect signal is received from the physical port, block 540 is processed. If a busy or ringing signal is received from the physical port, however, block 520 is re-processed.

For yet another embodiment, the incoming permanent call comprises DTMF digits included in a compressed voice packet. VVP 400 uses a DSP (not shown) to decode the compressed voice packets, thus isolating the DTMF digits. Using the DTMF digits, VVP 400 initiates a call setup message requesting that call management 226 route the call from VVP 400 to the physical port corresponding to the DTMF digits. Provided a connect signal is received from the physical port, block 540 is processed. If a busy or ringing signal is received from the physical port, however, block 520 is re-processed.

At block 540, VVP 400 generates an off-hook signal indicating that VOPS 220 is available to receive data. In particular, translate 410 generates off-hook packets that are transmitted to node 240 via VOPE 405 and line 470. For one embodiment, VOPE 405 transmits off-hook packets every 20 milli-seconds ("ms"). For an alternative embodiment, VOPE 405 transmits packets according to a FRF.11 protocol. For another embodiment, VOPE 405 transmits packets according to a VoIP protocol.

At block 550, VVP 400 receives the call data from node 240. As previously described, node 240 transmits data following a permanent call protocol. Thus, at block 550, VCCS 415 converts the permanent call data to a switched call format. For example, for one embodiment, the node 240 transmitted data comprises voice packets having a voice payload and transport specific headers including, but not limited to, frame relay ("FR"), ATM, or transmission control protocol/internet protocol ("TCP/IP"). VCCS 415 replaces the header information of the voice packets with a switched call header format used by VOPS 220. Thus, allowing call management 220 to route data from VVP 400 to the physical port identified in decision block 530 using a switched call format. For another embodiment, the node 240 transmitted data comprises voice packets having a voice payload and voice protocol specific headers including, but not limited to, FRF.11, VoIP, or H.323. Accordingly, VCCS 415 replaces the header information of the voice packets with a switched call header format used by VOPS 220. Thus, allowing call management 220 to route data from VVP 400 to the physical port identified in decision block 530.

At decision block 560, VVP 400 determines whether the permanent call from node 240 has been terminated. For one embodiment, the call is terminated by node 240 transmitting on-hook packets. For another embodiment, the call is terminated by VOPS 220. For yet another embodiment, the call is terminated by the physical port identified in decision block 530. Provided the call is terminated, block 520 is processed. If the call remains active, however, block 550 is re-processed.

Figure 6:
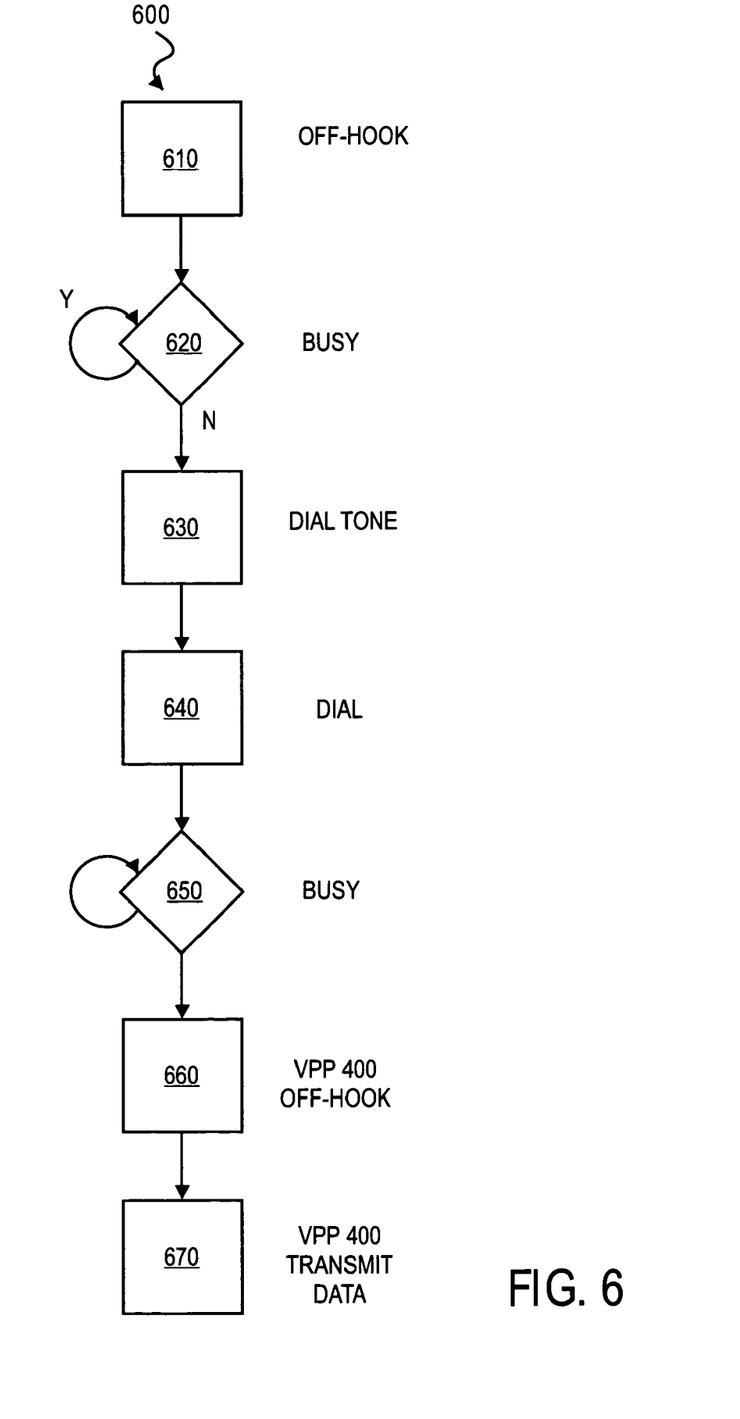
FIG. 6, shows one embodiment of a flow chart illustrating a switched call connected to a permanent call.

FIG. 6, shows one embodiment of a flow chart illustrating a switched call connected to a permanent call. In particular, flow chart 600 includes blocks 610 through 670. For one embodiment, the blocks show the steps used by VOPS 220 to connect one of physical ports 205a–205n to VVP 400. As previously described, VVP 400 is used to maintain a permanent call between VOPS 220 and a remote node. Thus, the connection of one of physical ports 205a–205n to VVP 400 results in one of physical ports 205a–205n placing a permanent call.

As illustrated in FIG. 6, operation begins in block 610. At block 610, a physical port of VOPS 220 initiates a switched call by transmitting an off-hook signal to call management 226. The off-hook signal is routed to call management 226 via line 271. At decision block 620, call management 226 responds to the off-hook signal. In particular, if call management 226 is busy, call management 226 generates a busy signal and block 620 is re-processed. If call management 226 is available, however, block 630 is processed.

At block 630, call management 226 generates a dial tone to indicate that routing system 225 is available to route the switched call. In response to the dial tone, at block 640, the physical port initiates a call setup message requesting that call management 226 route the call from the physical port to VVP 400. For one embodiment, the setup message comprises the physical port dialing a sequence of digits corresponding to VVP 400.

At block 650, VVP 400 responds to the call setup message from call management 226. For one embodiment, VVP 400 is busy. Thus, at block 650, telephony protocol 420 generates a busy signal and block 650 is re-processed. If VVP 400 is available, however, block 660 is processed.

At block 660, VVP 400 translates the call management 226 setup message into a permanent call format. In particular, in response to the call management 226 off-hook signal, translate 410 generates off-hook packets for transmission by VOPE 405. For one embodiment, VOPE 405 transmits packets indicating an off-hook every 20 milli-seconds ("ms"). For an alternative embodiment, VOPE 405 transmits packets according to a FRF.11 protocol. For another embodiment, VOPE 405 transmits packets according to a VoIP protocol. After the generation of the off-hook packets block 670 is processed.

At block 670, VVP 400 transmits the call data received from the physical port of VOPS 220. As previously described, VVP 400 transmits data following a permanent call protocol. Thus, at block 670, VCCS 415 converts the switched call data to a permanent call format. Subsequently, the permanent call data is transmitted via VOPE 405 and line 470. For one embodiment, VCCS 415 converts the switched call data to permanent call formats including, but not limited to, FRF.11, VoIP, or H.323.

Data Conversion Between Two Different Permanent Call Protocols

The virtual voice port may also be used to couple two different permanent call networks. In particular, a voice over packet system with two virtual voice ports may be used as a connection point between two different permanent call protocols. Thus, the voice over packet system provides a data conversion mechanism between two different protocols.

Figure 7:
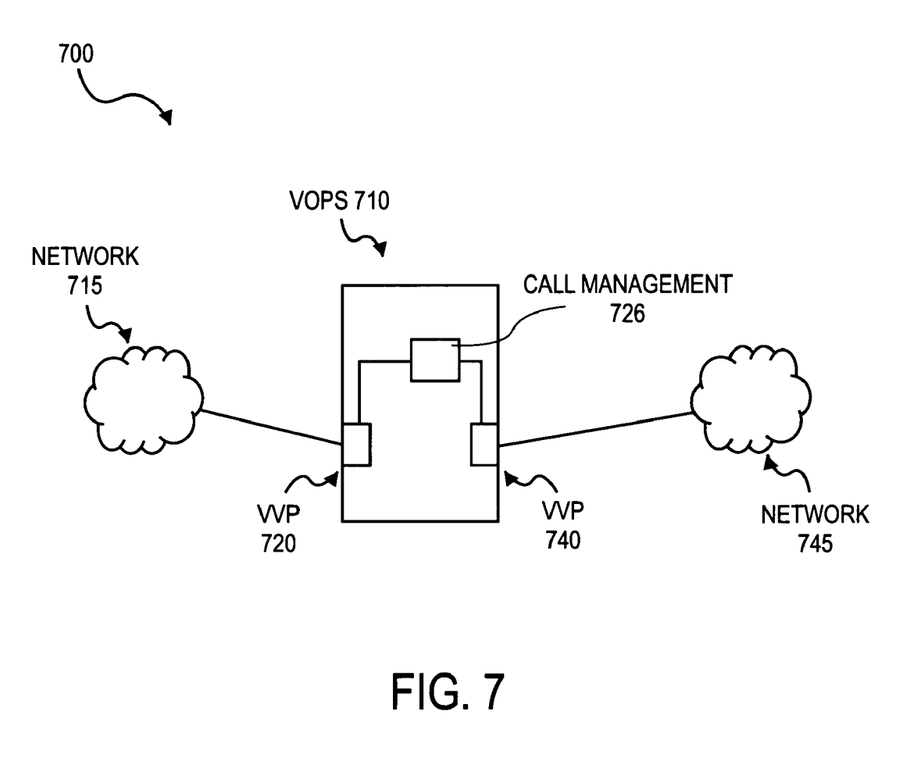
FIG. 7, illustrates one embodiment of a voice over packet system using two virtual voice ports to perform a data conversion between different permanent protocols.

FIG. 7, illustrates one embodiment of a voice over packet system using two virtual voice ports to perform a data conversion between different permanent protocols. In particular, system 700 comprises a network 715 coupled to VOPS 710 via VVP 720. VOPS 710 is also coupled to network 745 via VVP 740. Furthermore, VVP 720 and VVP 740 are coupled via call management 726.

For one embodiment, data is transferred from network 715 to network 745. Accordingly, VOPS 710 provides a communication media that transfers data between the two different networks. Specifically, the VCCS of VVP 720 replaces the header information of the voice packets transmitted by network 715 with a switched call header format. The conversion to the switched call header format allows call management 726 to route the voice packets from VVP 720 to VVP 740. Subsequently, the VCCS of VVP 740 replaces the switched call header information of the voice packets with the header information used by network 745. Subsequently, VVP 740 transmits the voice packets to network 745. For one embodiment, network 715 operates using a FRF.11 protocol. For an alternative embodiment, network 745 operates using a VoIP protocol.

In the foregoing specification, the invention has been described with reference to specific exemplary embodiments thereof. For example, for one embodiment it is contemplated that virtual voice port 260 comprises a software algorithm that emulates a physical port on VOPS 220. It will, however, be evident that various modifications and changes may be made thereof without departing from the broader spirit and scope of the invention as set forth in the appended claims. The specification and drawings are, accordingly, to be regarded in an illustrative rather than a restrictive sense.

What is claimed is:

1. A method for routing integrated traffic from a remote site to a voice over packet system, the method comprising:
   receiving control signals at a virtual voice port of the voice over packet system, wherein the control signals request a data transmission from the remote site to the voice over packet system;
   translating the control signals to internal signals of the voice over packet system, wherein the translated signals enable transfer of data from the virtual voice port to a physical port of the voice over packet system;
   transmitting data from the remote site to the virtual voice port; and
   transferring the transmitted data from the virtual voice port to the physical port.

2. The method of claim 1, wherein the control signals are configured to a permanent call protocol.

3. The method of claim 2, wherein the internal signals are configured to a switched call protocol.

4. The method of claim 1 further comprising, translating the transmitted data to a packet structure prior to transferring the transmitted data to the physical port.

5. The method of claim 4, wherein the packet structure comprises an Asynchronous Transfer Mode (ATM) format.

6. The method of claim 4, wherein the packet structure comprises a Frame Relay format.

7. The method of claim 4, wherein the packet structure comprises a transmission control protocol/internet protocol ("TCP/IP") format.

8. A method for routing integrated traffic from a voice over packet system to a remote site, the method comprising:
   transmitting control signals from a physical port of the voice over packet system to a virtual voice port of the voice over packet system, wherein the control signals request a data transmission from the physical port to the virtual voice port;
   translating the controls signals to a transmission format, wherein the transmission format is operable to request a data transmission from the virtual voice port to the remote site;
   transferring data from the physical port to the virtual voice port; and
   transmitting the data from the virtual voice port to the remote site.

9. The method of claim 8, wherein the control signals are configured to a switched call protocol.

10. The method of claim 9, wherein the transmission format is configured to a permanent call protocol.

11. The method of claim 8 further comprising, translating the data to a permanent call structure prior to transmitting the data to the remote site.

12. The method of claim 11, wherein the translated data comprises a FRF.11 format.

13. A computer readable medium containing executable instructions which, when executed in a processing system, cause the system to perform the steps for routing integrated traffic from a remote site to a voice over packet system, the routing of integrated traffic comprising:

receiving control signals at a virtual voice port of the voice over packet system, wherein the control signals request a data transmission from the remote site to the voice over packet system;

translating the controls signals to internal signals of the voice over packet system, wherein the translated signals enable transfer of data from the virtual voice port to a physical port of the voice over packet system;

transmitting data from the remote site to the virtual voice port; and transferring the transmitted data from the virtual voice port to the physical port.

14. The computer readable medium of claim 13, wherein the control signals are configured to a permanent call protocol.

15. The computer readable medium of claim 14, wherein the internal signals are configured to a switched call protocol.

16. The computer readable medium of claim 13 further comprising, translating the transmitted data to a packet structure prior to transferring the transmitted data to the physical port.

17. The computer readable medium of claim 16, wherein the packet structure comprises an Asynchronous Transfer Mode (ATM) format.

18. The computer readable medium of claim 16, wherein the packet structure comprises a Frame Relay format.

19. The computer readable medium of claim 16, wherein the packet structure comprises a transmission control protocol/internet protocol ("TCP/IP") format.

20. A computer readable medium containing executable instructions which, when executed in a processing system cause the system to perform the steps for routing integrated traffic from a voice over packet system to a remote site, the routing the integrated traffic comprising:

transmitting control signals from a physical port of the voice over packet system to a virtual voice port of the voice over packet system, wherein the control signals request a data mission from the physical port to the virtual voice port;

translating the controls signals to a transmission format, wherein the transmission format is operable to request a data transmission from the virtual voice port to the remote site;

transferring data from the physical port to the virtual voice port; and transmitting the data from the virtual voice port to the remote site.

21. The computer readable medium of claim 20, wherein the control signals are configured to a switched call protocol.

22. The computer readable medium of claim 21, wherein the transmission format is configured to a permanent call protocol.

23. The computer readable medium of claim 20 further comprising, translating the data to a permanent call structure prior to transmitting the data to the remote site.

24. The computer readable medium of claim 23, wherein the translated data comprises a FRF.11 format.

25. A voice over packet system comprising:

a plurality of physical ports coupled to a routing system, wherein the plurality of physical ports are operable to maintain a first call connection with a remote node coupled to the routing system;

a virtual voice port coupled to the routing system, wherein the virtual voice port is operable to maintain a second call connection with the remote node; and a call management system coupled to the routing system, the plurality of physical ports and the virtual voice port, wherein the call management system is configured to couple at least one of the physical ports to the virtual voice port system using a call set up procedure.

26. The voice over packet system of claim 25, wherein the call management system is further operable to couple at least one of the physical ports to the virtual voice port system.

27. The voice over packet system of claim 26, wherein the call management system is operable to selectively couple at least one of the physical ports to the routing system.

28. The voice over packet system of claim 26, wherein the first call connection comprises a switched call.

29. The voice over packet system of claim 26, wherein the second call connection comprises a permanent call.

30. The voice over packet system of claim 29, wherein the second call connection comprises a FRF.11 format.

31. An apparatus to route integrated traffic from a voice over packet system to a remote site, comprising:

means for transmitting control signals from a physical port of the voice over packet system to a virtual voice port of the voice over packet system, wherein the control signals request a data transmission from the physical port to the virtual voice port;

means for translating the controls signals to a transmission format, wherein the transmission format is operable to request a data transmission from the virtual voice port to the remote site;

means for transferring data from the physical port to the virtual voice port; and transmitting the data from the virtual voice port to the remote site.

32. An apparatus to route integrated traffic from a remote site to a voice over packet system, comprising:

means for receiving control signals at a virtual voice port of the voice over packet system, wherein the control signals request a data transmission from the remote site to the voice over packet system;

means for translating the control signals to internal signals of the voice over packet system, wherein the translated signals enable transfer of data from the virtual voice port to a physical port of the voice over packet system;

means for transmitting data from the remote site to the virtual voice port; and means for transferring the transmitted data from the virtual voice port to the physical port.

* * * * *